United States Patent
Ishikawa

(10) Patent No.: US 10,924,451 B2
(45) Date of Patent: Feb. 16, 2021

(54) COMMUNICATION DEVICE, CONTROL METHOD OF COMMUNICATION DEVICE, AND STORAGE MEDIUM

(71) Applicant: CANON KABUSHIKI KAISHA, Tokyo (JP)

(72) Inventor: Akira Ishikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 15/815,546

(22) Filed: Nov. 16, 2017

(65) Prior Publication Data
US 2018/0145944 A1    May 24, 2018

(30) Foreign Application Priority Data
Nov. 22, 2016 (JP) .............................. JP2016-227214

(51) Int. Cl.
*H04L 29/12* (2006.01)
*G06F 1/3234* (2019.01)

(52) U.S. Cl.
CPC ........ *H04L 61/2015* (2013.01); *G06F 1/3284* (2013.01); *H04L 61/2053* (2013.01); *Y02D 10/00* (2018.01)

(58) Field of Classification Search
CPC ............. H04L 61/2015; H04L 61/2053; G06F 1/3284; Y02D 10/159
USPC ....................................................... 709/220
See application file for complete search history.

(56) References Cited

U.S. PATENT DOCUMENTS

| 7,603,574 B1* | 10/2009 | Gyugyi | H04L 12/12 713/300 |
| 2009/0193157 A1* | 7/2009 | Chen | H04L 12/12 710/16 |
| 2010/0082779 A1* | 4/2010 | Min | H04L 29/12273 709/220 |
| 2010/0223484 A1* | 9/2010 | Bold | G06F 1/206 713/324 |
| 2012/0017126 A1* | 1/2012 | Yamano | G06F 11/0733 714/48 |
| 2013/0088749 A1* | 4/2013 | Park | G06F 1/3284 358/1.15 |
| 2017/0251079 A1* | 8/2017 | Duckett | H04L 67/34 |

FOREIGN PATENT DOCUMENTS

| CN | 108023969 A | 5/2018 |
| JP | 2008-205925 A | 9/2008 |
| JP | 2009-027348 A | 2/2009 |

* cited by examiner

*Primary Examiner* — Zi Ye
(74) *Attorney, Agent, or Firm* — Canon U.S.A., Inc. IP Division

(57) ABSTRACT

When a communication device obtains an IP address from a DHCP server at the time of detecting link-up, an IP address of the communication device is changed before and after the link-up. When link-up is detected, the communication device determines whether or not it is necessary to obtain an IP address from the DHCP server again. Then, in a case where it is unnecessary to obtain an IP address from the DHCP server again, the communication device does not obtain the IP address from the DHCP server.

8 Claims, 4 Drawing Sheets

DHCP SETTING

DO YOU OBTAIN IP ADDRESS FROM DHCP SERVER AGAIN AT THE TIME OF DETECTING LINK-UP?

☑ OBTAIN

☐ NOT OBTAIN

201 — OK    BACK

200

START

OBTAIN IP ADDRESS FROM DHCP SERVER — S301

END

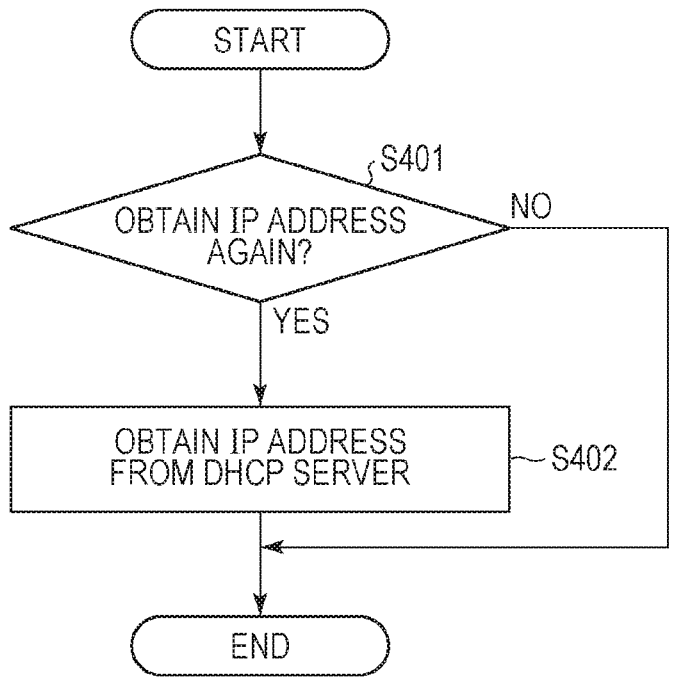
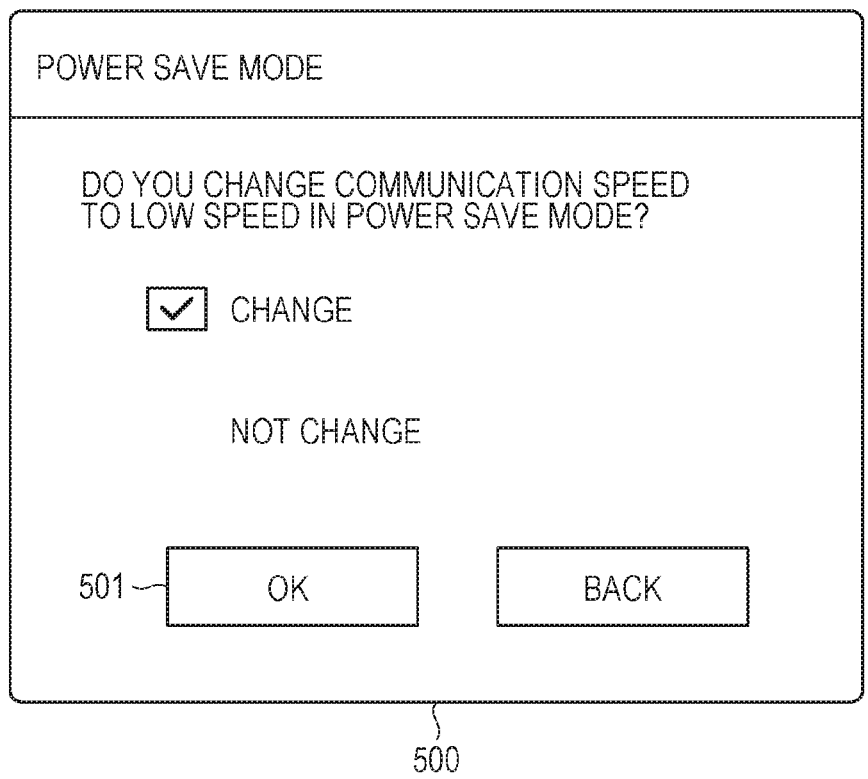

ical Patent Laid-Open No. 2009-027348 discloses a configuration in which, when it is time to request extension of a lease period of an IP address, a printing device that operates in a sleep mode returns from the sleep mode and requests the DHCP server to extend the lease period.

A general communication device obtains an IP address from a DHCP server at the time of activation and thereafter obtains an IP address from the DHCP server again as link-up is detected. In a case where the IP address is obtained from the DHCP server again, the communication device obtains, from the DHCP server, an IP address different from the IP address that the communication device has used so far in some cases depending on specifications of the DHCP server. This means that the IP address of the communication device is changed, and, in a case where, for example, a PC of a user communicates with the communication device, the IP address of the communication device is changed and therefore the PC of the user cannot communicate with the communication device.

SUMMARY

In view of the above, a communication device that uses an IP address obtained from a DHCP server, which is provided by the present disclosure, includes: a determining unit configured to, in a case where the communication device detects link-up, determine whether or not it is necessary to obtain the IP address from the DHCP server again on the basis of a setting of the communication device; and an obtaining unit configured to obtain the IP address from the DHCP server in a case where the determining unit determines that it is necessary to obtain the IP address again and configured not to obtain the IP address from the DHCP server in a case where the determining unit determines that it is unnecessary to obtain the IP address again.

Further features of the present invention will become apparent from the following description of exemplary embodiments (with reference to the attached drawings).

BRIEF DESCRIPTION OF THE DRAWINGS

FIG. 4 is a flowchart showing a process executed when the printing device 100 detects link-up.
FIG. 5 illustrates a setting screen.

DESCRIPTION OF THE EMBODIMENTS

Hereinafter, a best mode for implementing the present invention will be described with reference to the drawings. Note that the following embodiments are not intended to limit inventions according to claims, and all combinations of features described in the embodiments are not necessarily required for solution of the inventions.

First Embodiment

Figure 1:
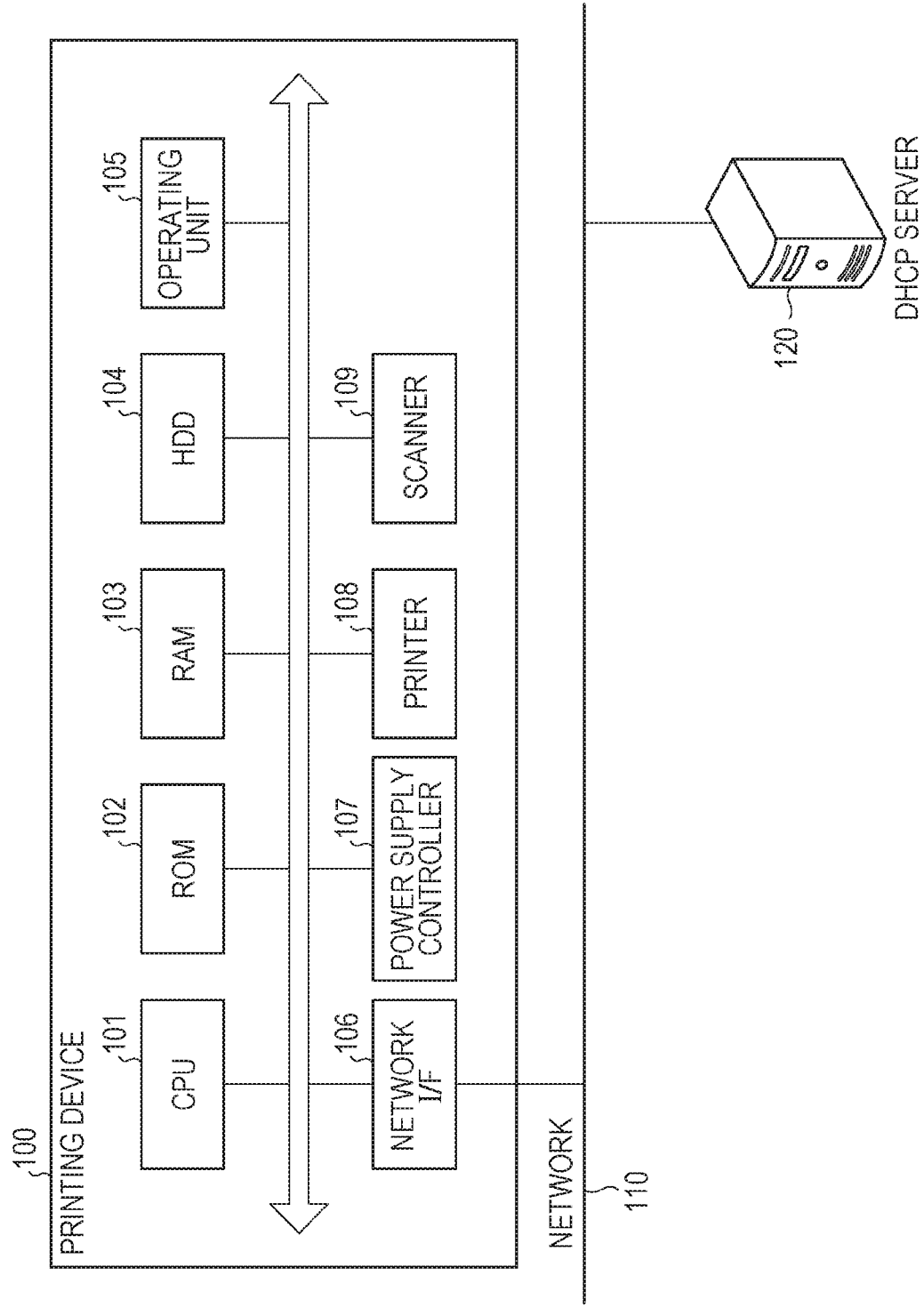
FIG. 1 illustrates a communication system.

First, an overview of a communication system and a hardware configuration of a printing device 100 will be described with reference to FIG. 1. The communication system of this embodiment includes the printing device 100 and a DHCP server 120, and the printing device 100 and the DHCP server 120 communicate via a network 110.

The printing device 100 requests an IP address from the DHCP server 120 when the printing device 100 is activated. The DHCP server 120 that has received the request determines an IP address to be distributed to the printing device 100 and then notifies the printing device 100 of the determined IP address. The printing device 100 that has obtained the IP address from the DHCP server 120 sets the obtained IP address as an IP address of the printing device 100 itself. A lease period is set in the IP address that the DHCP server 120 distributes to the printing device 100, and the printing device 100 requests the DHCP server 120 to update the lease period before the lease period elapses. Further, when the printing device 100 detects link-up, the printing device 100 determines whether to obtain an IP address from the DHCP server 120 again in accordance with a result of a setting on a setting screen 200 in FIG. 2 described below. This process will be described in detail below. The link-up means that the printing device 100 is connected to a network and can therefore communicate with a device on the network.

The hardware configuration of the printing device 100 will be described. The printing device 100 includes a CPU 101, a ROM 102, a RAM 103, an HDD 104, an operating unit 105, a network I/F 106, a power supply controller 107, a printer 108, and a scanner 109. Each unit of the printing device 100 transmits and receives control signals and data via a bus.

The CPU 101 reads control programs that the ROM 102 stores and executes various processes for controlling operation of the printing device 100. The ROM 102 stores the control programs. The RAM 103 is used as a temporary storage area such as a main memory and a work area of the CPU 101. The HDD 104 is a nonvolatile storage medium that stores various data.

It is assumed that, in the printing device 100 of this embodiment, a single CPU 101 executes processes shown in flowcharts described below. However, another embodiment may be employed. For example, a plurality of CPUs can also cooperatively execute the processes shown in the flowcharts described below. Further, a part of the processes in the flowcharts described below may be executed by using a hardware circuit such as an ASIC.

The operating unit 105 includes a display having a touch panel function and various kinds of hardware keys, and the display of the operating unit 105 displays various kinds of operation screens. A user can input instructions and information to the printing device 100 via the operating unit 105. The network I/F 106 is connected to the network 110 via a LAN cable and communicates with an external device (e.g., PC) on the network 110. The printer 108 executes a printing process with respect to a sheet on the basis of printing data that the network I/F 106 has received. The scanner 109 reads a document placed by the user and generates an image of the document. The image of the document generated by the scanner 109 is printed by the printer 108 (copy process) or is stored on the HDD 104.

The power supply controller 107 controls power supply to each unit of the printing device 100. In this embodiment, the printing device 100 has a normal power mode and a power save mode.

The normal power mode is a power mode in which power is supplied to the whole printing device 100 (the CPU 101, the ROM 102, the RAM 103, the HDD 104, the operating unit 105, the network I/F 106, the power supply controller 107, the printer 108, and the scanner 109). When a condition of transition to the power save mode is satisfied, the printing device 100 transitions to the power save mode. For example, when predetermined time (e.g., 5 minutes) elapses while user operation or data communication is not being performed with respect to the printing device 100 or when the user inputs an instruction to transition to the power save mode via the operating unit 105, the printing device 100 determines that the condition of transition to the power save mode is satisfied. When the printing device 100 transitions to the power save mode, power supply to the operating unit 105, the network I/F 106, and the power supply controller 107 continues, whereas power supply to the CPU 101, the ROM 102, the RAM 103, the HDD 104, the printer 108, and the scanner 109 is stopped. When comparing the normal power mode and the power save mode, power consumption of the printing device 100 is lower in the power save mode. When the network I/F 106 receives a predetermined packet (e.g., print job) or the operating unit 105 accepts user operation in the power save mode, the printing device 100 transitions from the power save mode to the normal power mode.

When the printing device 100 transitions from the normal power mode to the power save mode, a communication speed of the printing device 100 is changed from a high speed (e.g., 1 Gbps) to a low speed (e.g., 10 Mbps). Further, when the printing device 100 transitions from the power save mode to the normal power mode, the communication speed of the printing device 100 is changed from a low speed (e.g., 10 Mbps) to a high speed (e.g., 1 Gbps).

Figures 2, 3:
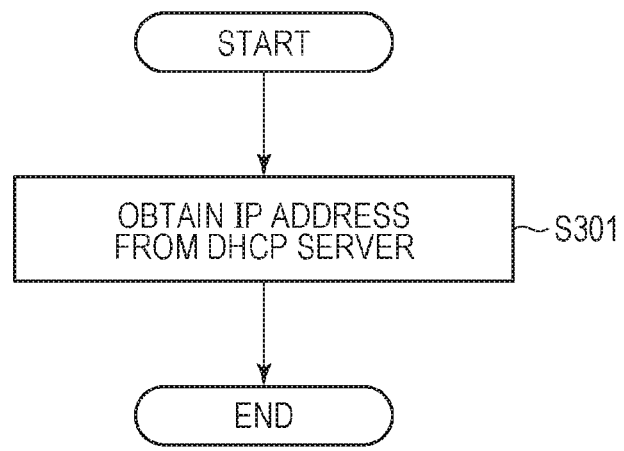
FIG. 2 illustrates a setting screen.
FIG. 3 is a flowchart showing a process executed when a printing device 100 is activated.

Next, the setting screen 200 displayed by the operating unit 105 of the printing device 100 will be described with reference to FIG. 2. The setting screen 200 is a setting screen for allowing the user to set whether to obtain an IP address from the DHCP server again at the time of detecting link-up.

The user selects "Obtain" in a case where the user desires to cause the printing device 100 to execute a conventional process of obtaining an IP address from the DHCP server again at the time of detecting link-up. On the contrary, the user selects "Not obtain" in a case where an IP address is not obtained from the DHCP server at the time of detecting link-up, in other words, the user desires to cause the printing device 100 to continuously use the IP address that is currently used even when link-up is detected. The setting screen 200 shows a state in which "Obtain" is selected by the user. When the user selects (presses in a case of a touch panel) an OK button 201, the printing device 100 stores, on the HDD 104, a result of the setting on the setting screen 200.

The printing device 100 obtains an IP address from the DHCP server in an initial process executed at the time of activation. This process will be described with reference to a flowchart in FIG. 3. A step shown in the flowchart in FIG. 3 is processed by the CPU 101 developing the control program that the ROM 102 stores in the RAM 103 and executing the control program.

In Step S301, the CPU 101 obtains an IP address from the DHCP server. A method of obtaining an IP address will be specifically described. The CPU 101 controls the network I/F 106 so that a DHCP DISCOVER packet is transmitted. The DHCP server 120 that has received the DHCP DISCOVER packet transmitted by the network I/F 106 transmits a DHCP OFFER packet to the printing device 100. The DHCP OFFER packet includes a candidate IP address that the DHCP server 120 allocates to the printing device 100. When the network I/F 106 of the printing device 100 receives the DHCP OFFER packet, the CPU 101 controls the network I/F 106 so that a DHCP REQUEST packet is transmitted. The DHCP REQUEST packet is a packet for officially requesting that the printing device 100 use the IP address included in the DHCP OFFER packet. The DHCP server 120 that has received the DHCP REQUEST packet transmitted by the network I/F 106 permits use of the IP address by transmitting a DHCP ACK packet to the printing device 100. The printing device 100 that has received the DHCP ACK packet sets the IP address obtained from the DHCP server 120 as an IP address of the printing device 100 itself and uses the IP address in subsequent communication.

Hereinabove, the process for obtaining an IP address from the DHCP server when the printing device 100 is activated has been described with reference to the flowchart in FIG. 3. Note that the printing device 100 obtains an IP address from the DHCP server at the time of activation, regardless of which one of "Obtain" and "Not obtain" is set on the setting screen 200.

Link-up occurs in the printing device 100 by plugging and unplugging a LAN cable or when the printing device 100 transitions from the power save mode to the normal power mode. When the printing device 100 detects link-up, the printing device 100 of this embodiment changes whether to obtain an IP address from the DHCP server again on the basis of a result of a setting on the setting screen 200. This changing process will be described with reference to a flowchart in FIG. 4. Each step shown in the flowchart in FIG. 4 is processed by the CPU 101 developing the control program that the ROM 102 stores in the RAM 103 and executing the control program.

When the CPU 101 of the printing device 100 detects link-up, the CPU 101 determines whether or not it is necessary to obtain an IP address from the DHCP server again in Step S401. In a case of this embodiment, the CPU 101 detects link-up occurring by plugging and unplugging a LAN cable or when the printing device 100 transitions from the power save mode to the normal power mode. Note that link-up occurs also in a case where the printing device 100 transitions from the normal power mode to the power save mode. However, power is not supplied to the CPU 101 in a case where this link-up occurs, and therefore the CPU 101 does not detect this link-up. In Step S401, the CPU 101 confirms the result of the setting on the setting screen 200 in FIG. 2, which is stored on the HDD 104. Then, in a case where "Obtain" is set, the CPU 101 determines that it is necessary to obtain an IP address from the DHCP server again, and the process proceeds to Step S402. On the contrary, in a case where "Not obtain" is set, the CPU 101 determines that it is unnecessary to obtain an IP address from the DHCP server again, and the process shown in the flowchart in FIG. 4 is terminated. When it is determined that it is unnecessary to obtain an IP address from the DHCP server again, the printing device 100 continuously uses the IP address that is currently used as it is.

Next, Step S402 will be described. In Step S402, the CPU 101 obtains an IP address from the DHCP server. A process executed in Step S402 is similar to the process described in Step S301 of FIG. 3, and therefore detailed description thereof is omitted.

As described above, at the time of detecting link-up, the printing device 100 of this embodiment can change whether to obtain an IP address from the DHCP server again on the basis of a result of a setting on the setting screen 200. In a case where the user desires to cause the printing device 100 to execute a conventional process of obtaining an IP address from the DHCP server again at the time of detecting link-up, the user sets "Obtain" on the setting screen 200. On the contrary, in a case where the user desires to cause the printing device 100 to continuously use an IP address that is currently used even when link-up is detected, the user sets "Not obtain" on the setting screen 200. When "Not obtain" is set on the setting screen 200, it is possible to prevent the IP address of the printing device 100 from being changed before and after the link-up is detected.

Second Embodiment

A second embodiment will be described as a modification example of the first embodiment. In the second embodiment, the user sets whether to change a communication speed of the printing device 100 to a low speed in the power save mode. Then, the printing device 100 changes whether to obtain an IP address from the DHCP server again on the basis of this setting. A configuration of the printing device 100 in the second embodiment is similar to the configuration described with reference to FIG. 1.

Further, also in the second embodiment, the printing device 100 obtains an IP address from the DHCP server in an initial process executed at the time of activation. This process is similar to the process described with reference to FIG. 3.

A setting screen 500 in FIG. 5 is a setting screen for allowing a user to set whether to change the communication speed of the printing device 100 to a low speed in the power save mode and is displayed by the operating unit 105 of the printing device 100. In a case where the communication speed of the printing device 100 is changed to a low speed in the power save mode, the user selects "Change". On the contrary, in a case where the communication speed of the printing device 100 is not changed to a low speed in the power save mode, the user selects "Not change". When the user selects an OK button 501, the printing device 100 stores, on the HDD 104, a result of the setting on the setting screen 500.

When "Change" is selected on the setting screen 500, the printing device 100 transitions to the power save mode and changes the communication speed from a high speed (e.g., 1 Gbps) to a low speed (e.g., 10 Mbps). With this, power consumption of the printing device 100 in the power save mode is reduced, as compared to a case where the communication speed is maintained at a high speed in the power save mode. The user who desires to obtain such an effect selects "Change" on the setting screen 500.

On the contrary, when "Not change" is selected on the setting screen 500, the printing device 100 maintains the communication speed at a high speed even when the printing device 100 transitions to the power save mode, and a link is not changed in a case where the printing device 100 transitions from the power save mode to the normal power mode. With this, a response to a packet that causes returning from the power save mode can be quickly executed, as compared to a case where the communication speed is changed to a low speed in the power save mode. The user who desires to obtain such an effect selects "Not change" on the setting screen 500.

Figure 6:
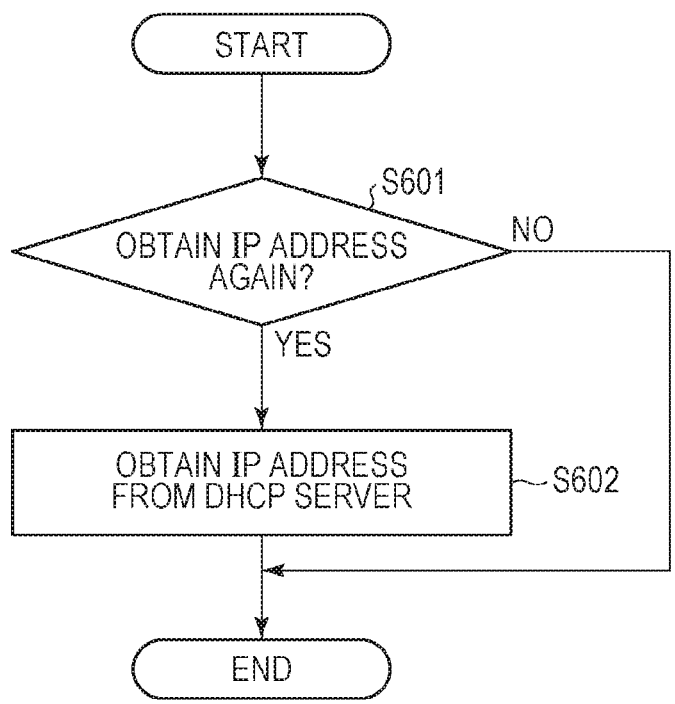
FIG. 6 is a flowchart showing a process executed when the printing device 100 detects link-up.

Next, a process executed in a case where the CPU 101 of the printing device 100 detects link-up will be described with reference to a flowchart in FIG. 6. Each step shown in the flowchart in FIG. 6 is processed by the CPU 101 developing the control program that the ROM 102 stores in the RAM 103 and executing the control program.

When the CPU 101 of the printing device 100 detects link-up, the CPU 101 determines whether or not it is necessary to obtain an IP address from the DHCP server again in Step S601. This determination is realized by causing the CPU 101 to confirm the result of the setting on the setting screen 500 in FIG. 5, which is stored on the HDD 104.

In a case where "Not change to low speed" is set on the setting screen 500, the CPU 101 determines that it is necessary to obtain an IP address from the DHCP server again. In a case where "Not change to low speed" is set on the setting screen 500, the communication speed is not changed in a case where the printing device 100 transitions from the power save mode to the normal power mode. Not changing the communication speed means that link-up does not occur in a case where the printing device 100 transitions from the power save mode to the normal power mode. Therefore, it can be said that there is a high possibility that a factor of link-up detected by the CPU 101 in a case where "Not change to low speed" is set on the setting screen 500 is plugging and unplugging of the LAN cable. In addition, the fact that the factor of the link-up is plugging and unplugging of the LAN cable means that there is a high possibility that a network environment in which the printing device 100 is connected has been changed. Thus, in this embodiment, the CPU 101 determines that it is necessary to obtain an IP address from the DHCP server again.

When the CPU 101 determines that it is necessary to obtain an IP address from the DHCP server again in Step S601, the process proceeds to Step S602. Then, in Step S602, the CPU 101 obtains an IP address from the DHCP server. A process executed in Step S602 is similar to the process described with reference to Step S301 in FIG. 3, and therefore detailed description thereof is omitted.

On the contrary, in a case where "Change to low speed" is set on the setting screen 500, the CPU 101 determines that it is unnecessary to obtain an IP address from the DHCP server again in Step S601. Then, the process shown in the flowchart in FIG. 6 is terminated. In a case where "Change to low speed" is set on the setting screen 500, the communication speed is changed in a case where the printing device 100 transitions from the power save mode to the normal power mode. Changing the communication speed means that link-up occurs in a case where the printing device 100 transitions from the power save mode to the normal power mode. Therefore, it is impossible to determine whether the factor of the link-up detected by the CPU 101 in a case where "Change to low speed" is set on the setting screen 500 is plugging and unplugging of the LAN cable or transition of the printing device 100 from the power save mode to the normal power mode. In view of this, in a case where "Change to low speed" is set on the setting screen 500, the CPU 101 does not obtain an IP address from the DHCP server again even when the CPU 101 detects link-up and the printing device 100 continuously uses the IP address that is currently used as it is.

As described above, at the time of detecting link-up, the printing device 100 of this embodiment can change whether to obtain an IP address from the DHCP server again on the basis of the result of the setting on the setting screen 500. In a case where "Communication speed is not changed to low speed in power save mode" is set on the setting screen 500, there is a high possibility that the link-up detected by the CPU 101 is plugging and unplugging of the LAN cable. Therefore, an IP address is obtained from the DHCP server again. On the contrary, in a case where "Communication speed is changed to low speed in power save mode" is set on the setting screen 500, the factor of the link-up detected by the CPU 101 cannot be identified, and therefore an IP address is not obtained from the DHCP server again.

Other Embodiments

The above-mentioned embodiments have been described by using the printing device 100 as an example. However, the present invention is also applicable to other types of communication devices such as a printer, a network scanner, and a PC as long as the communication device is a communication device that sets an IP address by using a DHCP server.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-227214, filed Nov. 22, 2016, which is hereby incorporated by reference herein in its entirety.

What is claimed is:

1. A communication device that has a network interface and allocates an IP address obtained from a DHCP server to the network interface and communicates with an external device by using the IP address, comprising:

at least one memory that stores instructions; and
at least one processor that executes the stored instruction to:
set, based on a user's operation via a setting screen, an operation setting of the communication device as to whether or not to change a communication speed to a low speed in a case where the communication device shifts to a power save mode,
when the communication device detects link-up of the network interface, determine that it is unnecessary to obtain the IP address from the DHCP server again if it is set as the operation setting to change the communication speed to the low speed in a case where the communication device shifts to the power save mode, and determine that it is necessary to obtain the IP address from the DHCP server again if it is set as the operation setting not to change the communication speed to the low speed in a case where the communication device shifts to the power save mode; and
in accordance with occurrence of link-up of the network interface, perform control to transmit a DHCP DISCOVER packet onto the linked-up network, to search for a DHCP server on the network, and to allocate, to the network interface, an IP address distributed from the DHCP server found by the search if it is determined to be necessary to obtain the IP address again;
wherein, if it is determined to be unnecessary to obtain the IP address again, the DHCP DISCOVER packet is not transmitted onto the linked-up network even in a case where link-up of the network interface occurs,
wherein, if it is set as the operation setting to change the communication speed to the low speed in a case where the communication device shifts to the power save mode, the communication device detects the link-up of network interface at least in a case where the communication transitions from the power save mode to a normal power mode.

2. The communication device according to claim 1, wherein the IP address is obtained from the DHCP server at a point in time at which the device starts up from a power OFF state and performs initialize processing regardless of the operation setting.

3. The communication device according to claim 1, wherein the communication device detects the link-up of the network interface at least in a case where an operation of unplugging of a LAN cable from the network interface is performed and, after receiving the unplugging operation, an operation of plugging a LAN cable to the network interface is performed in the communication device.

4. The communication device according to claim 1, wherein the communication device is a printing device that executes printing on a sheet.

5. The communication device according to claim 1, wherein link-up that is detected in a case where the communication device shifts from the power save mode to a normal power mode occurs due to control of changing the communication speed from the low speed to a high speed.

6. A communication device that has a network interface and allocates an IP address obtained from a DHCP server to the network interface and communicates with an external device by using the IP address, comprising:
   at least one memory that stores instructions; and
   at least one processor that executes the stored instruction to:
      set, based on a user's operation via a setting screen, an operation setting of the communication device as to whether or not to change a communication speed to a low speed in a case where the communication device shifts to a power save mode,
      when the communication device detects link-up of the network interface, determine that it is unnecessary to obtain the IP address from the DHCP server again if it is set as the operation setting to change the communication speed to the low speed in a case where the communication device shifts to the power save mode, and determine that it is necessary to obtain the IP address from the DHCP server again if it is set as the operation setting not to change the communication speed to the low speed in a case where the communication device shifts to the power save mode;
      in accordance with occurrence of link-up of the network interface, perform control to transmit a DHCP DISCOVER packet onto the linked-up network, to search for a DHCP server on the network, and to allocate, to the network interface, an IP address distributed from the DHCP server found by the search if it is determined to be necessary to obtain the IP address again,
      wherein if it is determined to be unnecessary to obtain the IP address again, the DHCP DISCOVER packet is not transmitted onto the linked-up network even in a case where link-up of the network interface occurs,
      wherein the communication device detects the link-up of the network interface at least in a case where the communication speed is changed from the low speed to a high speed upon the shift from the power save mode to a normal mode.

7. A control method of a communication device that has a network interface and allocates an IP address obtained from a DHCP server to the network interface and communicates with an external device by using the IP address, comprising:
   setting, based on a user's operation via a setting screen, an operation setting of the communication device as to whether or not to change a communication speed to a low speed in a case where the communication device shifts into a power save mode;
   when the communication device detects link-up of the network interface, determining that it is unnecessary to obtain the IP address from the DHCP server again if it is set as the operation setting to change the communication speed to the low speed in the case where the communication device shifts to the power save mode, and determining that it is necessary to obtain the IP address from the DHCP server again if it is set as the operation setting not to change the communication speed to a low speed in the case where the communication device shifts to the power save mode; and
   in accordance with occurrence of link-up of the network interface, performing control to transmit a DHCP DISCOVER packet onto the linked-up network, to search for a DHCP server on the network, and allocating, to the network interface, an IP address distributed from the DHCP server found by the search if it is determined to be necessary to obtain the IP address again;
   not obtaining the IP address from the DHCP server if it is determined to be unnecessary to obtain the IP address again;
   wherein, if it is determined to be unnecessary to obtain the IP address again, the DHCP DISCOVER packet is not transmitted onto the linked-up network even in a case where linked-up of the network interface occurs,
   wherein, if it is set as the operation setting to change the communication speed to the low speed in a case where the communication device shifts to the power save mode, the communication device detects the link-up of network interface at least in a case where the communication transitions from the power save mode to a normal power mode.

8. A non-transitory computer readable storage medium storing a program for causing a computer to execute a control method of a communication device that has a network interface and allocates an IP address obtained from a DHCP server to the network interface and communication with an external device by using the IP address, the control method comprising:
   setting, based on a user's operation via a setting screen, an operation setting of the communication device as to whether or not to change a communication speed to a low speed in a case where the communication device shifts into a power save mode;
   when the communication device detects link-up of the network interface, determining that it is unnecessary to obtain the IP address from the DHCP server again if it is set as the operation setting to change the communication speed to the low speed in the case where the communication device shifts to the power save mode, and determine that it is necessary to obtain the IP address from the DHCP server again if it is set as the operation setting not to change the communication speed to the low speed in the case where the communication device shifts to the power save mode;
   in accordance with occurrence of the link-up of the network interface, performing control to transmit a DHCP DISCOVER packet onto the linked-up network to search for a DHCP server on the network, and allocating, to the network interface, an IP address distributed from the DHCP server found by the search if it is determined to be is necessary to obtain the IP address again;
   wherein if it is determined to be unnecessary to obtain the IP address again, the DHCP DISCOVER packet is not transmitted onto the linked-up network even in a case where link-up of the network interface occurs,
   wherein, if it is set as the operation setting to change the communication speed to the low speed in a case where the communication device shifts to the power save mode, the communication device detects the link-up of network interface at least in a case where the communication transitions from the power save mode to a normal power mode.

\* \* \* \* \*